Dec. 26, 1961  C. A. THURKOW  3,014,754
STORABLE VEHICLE FLOOR COVER AND CONTAINER
Filed Aug. 5, 1960  2 Sheets-Sheet 1
FIG. 1.
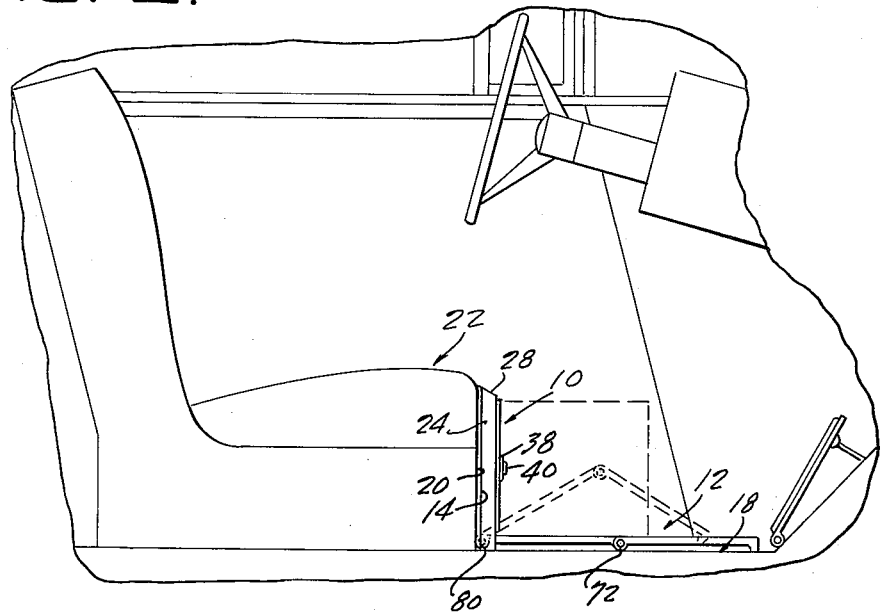
FIG. 2.
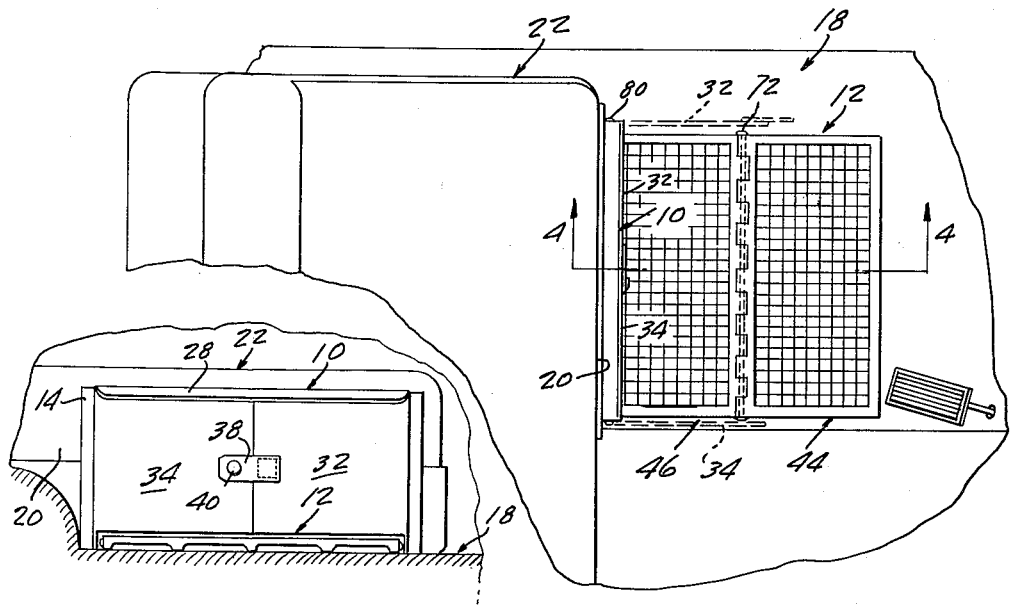
FIG. 3.
INVENTOR.
CHARLES A. THURKOW,
BY
McMorrow, Berman & Davidson
ATTORNEYS.

Dec. 26, 1961  C. A. THURKOW  3,014,754
STORABLE VEHICLE FLOOR COVER AND CONTAINER
Filed Aug. 5, 1960  2 Sheets-Sheet 2
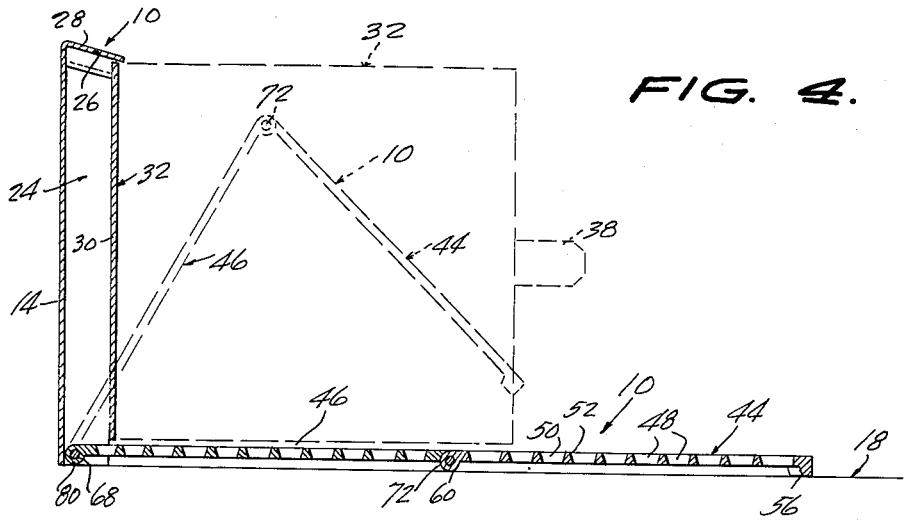
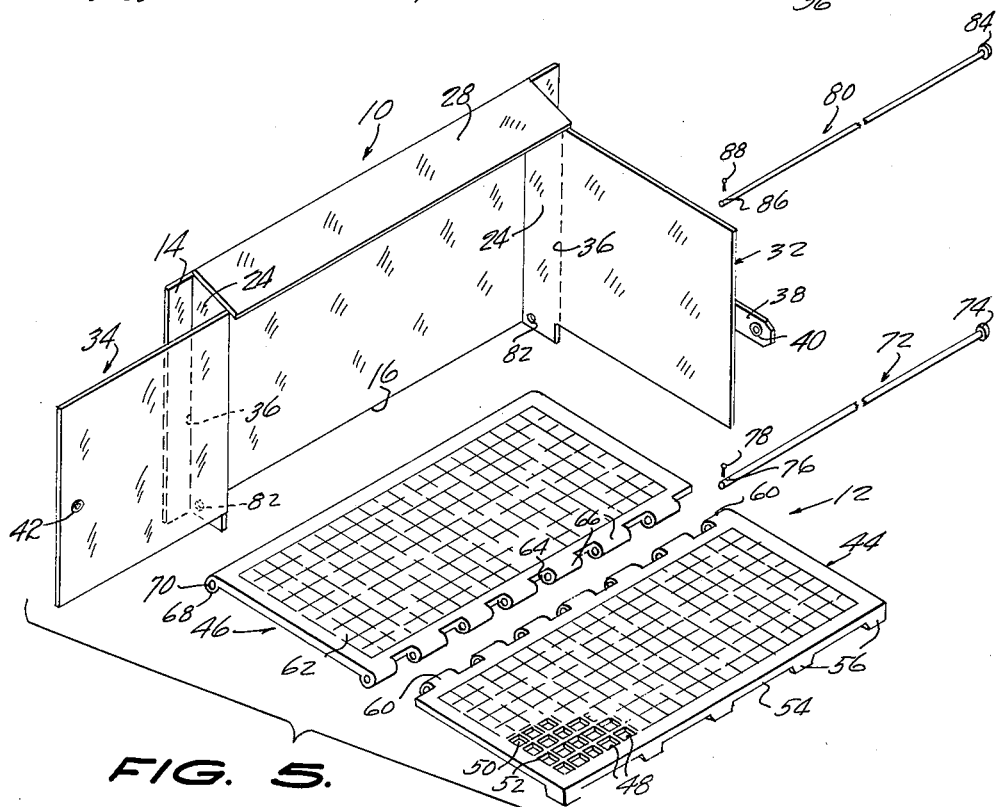
INVENTOR.
CHARLES A. THURKOW,
BY
McMorrow, Berman & Davidson
ATTORNEYS.

United States Patent Office 3,014,754
Patented Dec. 26, 1961

3,014,754
STORABLE VEHICLE FLOOR COVER
AND CONTAINER
Charles A. Thurkow, 1962 N. Orchard St.,
Chicago 14, Ill.
Filed Aug. 5, 1960, Ser. No. 47,674
3 Claims. (Cl. 296—75)

This invention relates to a novel combination storable cover for the usual floor mat in the driving compartment of a vehicle and a container for storing the cover when not in use, secured to the driver's seat.

The primary object of the invention is the provision of a practical and efficient assembly of the kind indicated wherein the cover is perforated and preferably in the form of an open-work grid, the container being secured to the front of the driver's seat and the grid being readily foldable into the container, when desired, the grid, when in covering relation to the usual floor mat, serving to scrape snow and mud from the shoes of the driver and to convey water and melted snow away from the driver's shoes, through openings of the grid, to the floor mat, so as to insulate the driver's shoes from water on the floor mat, and do away with operation of the vehicle with the driver's feet standing in water accumulating on the floor mat.

Another object of the invention is to provide a simple and relatively inexpensive assembly of the character indicated above wherein the grid is composed of relatively rigid plate-like sections which are hinged together to fold against each other and into the container, for contact and out-of-the-way storage, when not in use, the container being provided with door means to enclose the folded grid.

Other important objects and advantageous features of the invention will be apparent from the following description and the accompanying drawings, wherein, for purposes of illustration only, a specific form of the invention is set forth in detail.

In the drawings:

FIGURE 1 is a schematic side elevation, showing an assembly of the invention installed in the driver's compartment of a motor vehicle, the grid being shown in full lines in its operative position, and the grid and the container door means in other positions in phantom lines;

FIGURE 2 is a fragmentary top plan view of FIGURE 1;

FIGURE 3 is a fragmentary front elevation, with portions in section, showing the container, with its door means closed and the grid in position upon the vehicle floor;

FIGURE 4 is an enlarged vertical longitudinal section taken on the line 4—4 of FIGURE 2; and FIGURE 5 is an exploded perspective view of the assembly, per se, showing its components separated from each other.

Referring in detail to the drawings, wherein like numerals designate like parts throughout the several views, the illustrated assembly consists of a container 10 and a grid 12.

The container 10 comprises a horizontally elongated back wall 14 having a lower edge 16 which can rest upon or be located near to the vehicle floor 18 and engaged with and secured, in suitable manner, to the front surface 20 of the driver's seat 22. While the container 10 is shown as extending for the width of the driver's side of the seat 22, the same can be extended in length, if desired, to extend the entire width of the seat 22, where a "hump" or drive-shaft tunnel is not present on the floor 18.

The container 10 is devoid of a bottom wall, in order to provide for free drainage of the grid when stored in the container in a wet condition. The container has vertical side walls 24, shorter than the height of the seat 22 spaced inwardly from the ends of the back wall 14, and having forwardly and downwardly angled upper edges 26, upon which is suitably secured a forwardly and downwardly angled top wall 28 which extends forwardly beyond the forward edges 30 of the side walls.

Half-width doors 32 and 34, which are shorter than the container side walls 24 and spaced upwardly, at their lower edges, from the lower ends of the side walls, are vertically hinged on the forward edges 30 of the side walls. With the container constructed of such as impregnated and water-proofed plastic composition flexible board or the like, the hinging of the doors to the container side walls can be accomplished by means of fold lines, as indicated at 36. For securing the doors together in container-closing positions, the door 32 can have a tab 38 secured to its forward surface and reaching beyond its free edge, and having a snap fastener element 40 thereon, for engaging a snap fastener element 42 on the forward side of the door 32.

The grid 12, which is preferably formed of relatively rigid plastic material, comprises a forward flat plate-like rectangular section 44 and a rear plate-like section 46, the sections being preferably of substantially the same length and width, and dimensioned to fold freely into the container 10.

The forward grid section 44 comprises a rectangular flat plate formed over the major part of its area, within its borders, with preferably rectangular openings 48 of relatively large size, so as to provide for free drainage of water and snow and or mud from the driver's shoes to the floor 18, and so as to provide a multiplicity of edges 50, 52 on the plate to serve as scrapers for scraping mud or snow from the driver's shoes, and so as to serve as non-slip elements to prevent slipping of wet shoes thereon.

At its forward edge 54, the forward section 44 has depending therefrom longitudinally spaced floor-engaging feet 56 which make non-slip engagement with the floor 18, and serve to space the section above the floor 18, and the driver's shoes, above the floor and out of accumulated water, mud or snow thereon. On the rear edge 58 of the section 44 are formed longitudinally spaced hinge eyes 60 which extend rearwardly therefrom, and downwardly therefrom, as seen in FIGURE 4, to serve as feet, in conjunction with the feet 56, to space the section parallel above the floor 18.

The rear grid section 46 comprises a flat plate formed like the forward section 44, with openings 62 which serve the same purpose as the openings 48. On the forward edge 64 of the rear section 46 are formed longitudinally spaced hinge eyes 66, which extend forwardly therefrom, to engage between the hinge eyes 60 of the forward section 44. The hinge eyes 66 extend downwardly from the rear section and serve to engage the floor 18 and space the rear section upwardly therefrom. On the rear edges of the rear section 46 and extending downwardly therefrom, to serve as a single foot, is a full-length hinge pin barrel 68, provided with a longitudinal bore 70.

A single first long hinge pin 72 is extended through the interdigitated hinge eyes 60 and 66 and has a head 74 on one end, and an opening 76, at its other end, to receive such as a cotter pin 78, to hold the hinge pin 72 in place, and to hinge the grid sections 44 and 46 together, to fold upwardly against each other, from their coplanar operative positions.

For securing the grid 12 to the container 10, and providing for folding the grid into the container, a second single hinge pin 80 is provided, which is extended through the bore 70 of the hinge barrel 68 of the rear section 46, through holes 82 provided in the container side walls 24, at their lower ends. The hinge pin 80 is provided on one end with a head 84 and at its other end with an opening 86 to accommodate such as a cotter pin 88, for securing the hinge pin 80 in place.

In operation, with the grid 12 folded and stored in the container 10, with the forward section 44 folded against the rear section 46, the doors are opened forwardly and the grid sections unfolded onto the floor 18, and the doors reclosed and secured together until the grid is to be again stored. It is to be noted that, for cleaning or clearing the floor 18 of accumulated snow, mud, and/or water, free access to the floor is obtainable simply by folding the grid sections upwardly and rearwardly.

Although there has been shown and described herein a preferred form of the invention, it is to be understood that the invention is not necessarily confined thereto, and that any change or changes in the structure of and in the relative arrangements of components thereof are contemplated as being within the scope of the invention as defined by the claims appended hereto.

What is claimed is:

1. In combination, a vehicle floor, a driver's seat rising above the floor and having a front surface, a cover grid adapted to cover the area of said floor forwardly of and adjacent said front surface, a forward opening container supported against the front surface of the seat, and means connecting said grid to said container to swing upwardly and rearwardly from an operative position bearing upon the floor to a storage position within said container.

2. In combination, a vehicle floor, a driver's seat rising above the floor and having a front surface, a cover grid adapted to cover the area of said floor forwardly of and adjacent said front surface, a forward opening container supported against the front surface of the seat, said container including spaced side walls, and means connecting said grid to said side walls to swing upwardly and rearwardly from an operative position bearing upon the floor to a storage position between the side walls of said container.

3. In combination, a vehicle floor, a driver's seat rising above the floor and having a front surface, a cover grid for said floor, and means mounting said grid to swing upwardly and rearwardly from an operative position bearing upon the floor to a storage position against the front surface of the seat, said grid comprising hinged connected forward and rear sections adapted to be folded together and against the front surface of the seat, said mounting means comprising a forward opening container supported against the front surface of the seat, and hinge means extending across the interior of the container.

References Cited in the file of this patent

UNITED STATES PATENTS

| | | |
|---|---|---|
| 802,995 | Knox | Oct. 31, 1905 |
| 928,406 | Strain | July 20, 1909 |
| 1,475,765 | Gage | Nov. 27, 1923 |
| 1,736,572 | Berg | Nov. 19, 1929 |
| 1,760,422 | Mackie | May 27, 1930 |
| 2,315,180 | Arthur | Mar. 30, 1943 |